Aug. 22, 1961     T. C. GERNER     2,997,350
SELF-ADJUSTING THREADED BUSHING WITH LOCKING PIN
Filed Dec. 12, 1958     2 Sheets-Sheet 1

Theodore C. Gerner
INVENTOR.

BY *Clarence A. O'Brien*
*and Harvey B. Jacobson*
Attorneys

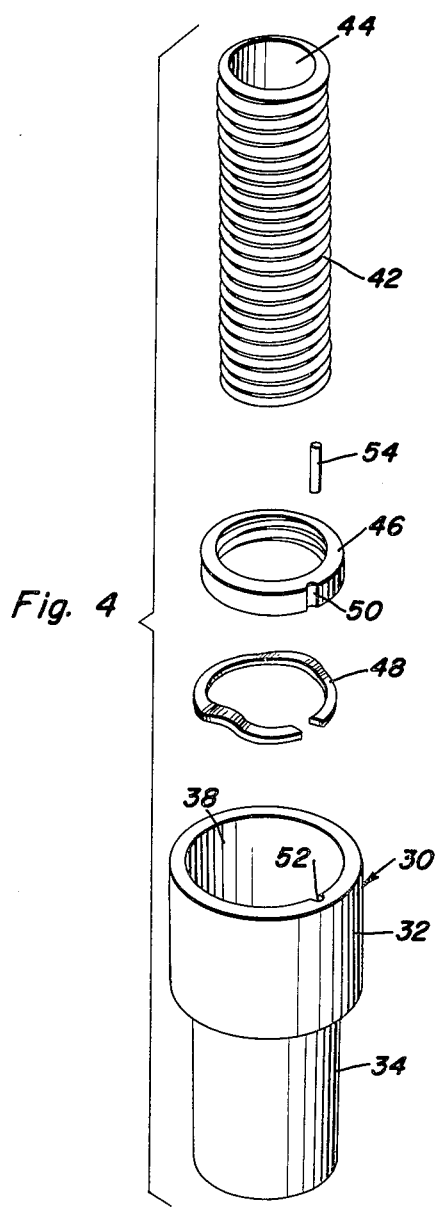
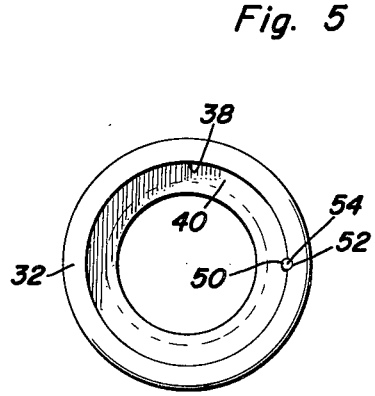
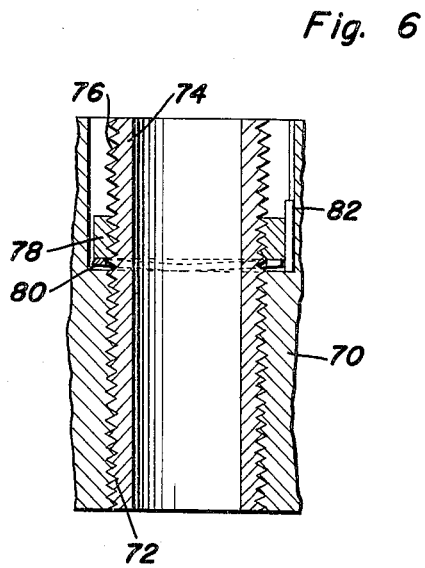
Theodore C. Gerner
INVENTOR.

United States Patent Office 2,997,350
Patented Aug. 22, 1961

2,997,350
SELF-ADJUSTING THREADED BUSHING
WITH LOCKING PIN
Theodore C. Gerner, P.O. Box 4305,
Oklahoma City, Okla.
Filed Dec. 12, 1958, Ser. No. 779,997
4 Claims. (Cl. 308—237)

This invention comprises a novel and useful self-adjusting threaded bushing with locking pin and more specifially relates to a wear take-up replacement bushing assembly specifically adapted for use with the idler arm of steering linkage for automotive vehicles whereby to restore to its original precision fit the worn journaling connection by which an idler arm is supported.

A more general purpose of the invention is to provide a wear take-up assembly for a swivelling screw threaded connection of a threaded male and female member by the provision of a new screw threaded journal therefor.

The primary object of this invention is to provide a replacement bushing assembly especially adapted for journaling the idler arms of a steering linkage and which may be readily and quickly applied without necessitating the replacement of the idler arm and with a minimum requirement for skilled labor.

A further object of the invention is to provide a replacement bushing assembly in accordance with the preceding objects which shall be of compact and simple construction, will provide a journal having a greater journaling area and which shall include means for resiliently taking up slack in the screw threaded components thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an exploded perspective view of the components making up the bushing assembly;

FIGURE 5 is a top plan view of the housing or body member of the assembly; and

FIGURE 6 is a view depicting the manner in which the bushing is employed for general use as a bushing slack take-up device.

Although the invention is not limited thereto, it is particularly adapted and applicable to the conventional steering linkages of automotive vehicles for the purpose of taking up wear or slack in the journal of the idler arm thereof.

Figure 1:
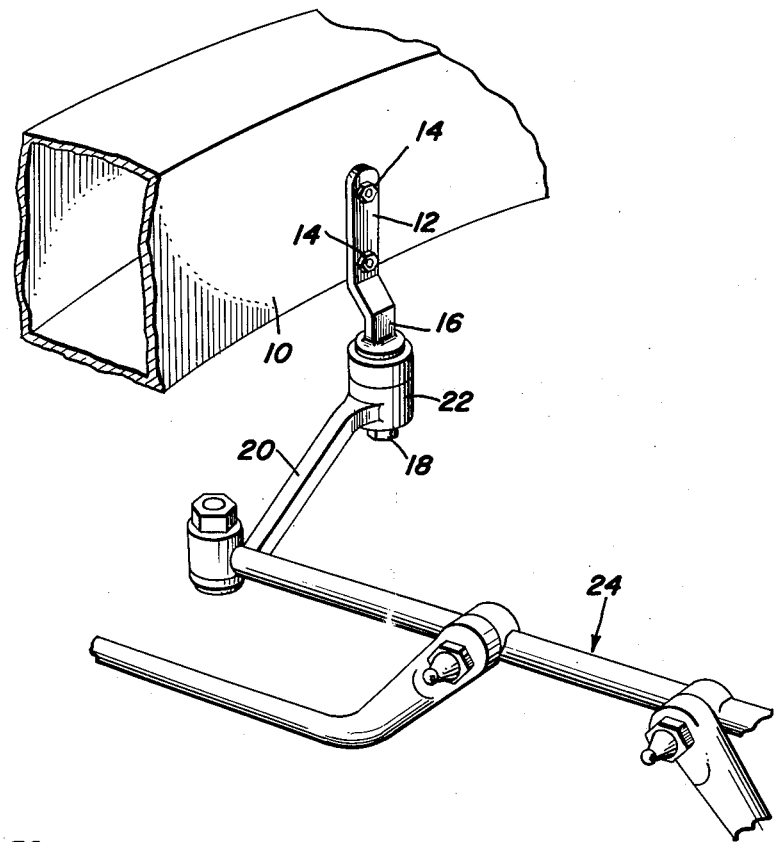
FIGURE 1 is a somewhat diagrammatic view, parts being broken away and showing in perspective of a portion of a steering linkage having an idler arm together with the bushing means for journaling the same and to which this invention has been applied.

Shown in FIGURE 1 is a portion of a vehicle frame as at 10 having secured thereto a support bracket 12 as by means of fastening bolts 14, this bracket having a depending shank 16 having a rounded lower end which is externally threaded to receive a fastening nut 18 by means of which an idler arm 20 has its hub portion 22 secured thereto. Threadedly engaged in the idler arm is a conventional bushing, not shown, which is retained upon the shank of the bracket 12 by means of the fastening nut 18. The idler arm 20 has the usual connection with the steering linkage, a portion of which is shown at 24 and which is of a well known construction.

When the conventional bushing by which the hub 22 of the idler arm is journaled upon the shank of the bracket 12 has become worn, it is customarily necessary to replace both this bushing and the idler arm in order to provide a new journal which has the desired precision of fit and is free of play therein.

The present invention, however, provides a replacement bushing which may interpose between the hub 22 and the shank of the support bracket 12 and which when employed will enable the worn idler arm 20 to continue in use and yet will restore the desired precision fit in the journal of the same.

For this purpose there is provided a body designated generally by the numeral 30 and which comprises a cylindrical upper portion 32 and a diametrically reduced cylindrical lower portion 34. An internally threaded bore 36 is provided in the lower portion 34, opening from the lower end of the latter, and communicating with a diametrically enlarged bore 38 opening from the upper end of the upper portion 32. The junction of these two bores is provided with an annular shoulder or seat 40.

Figure 2:
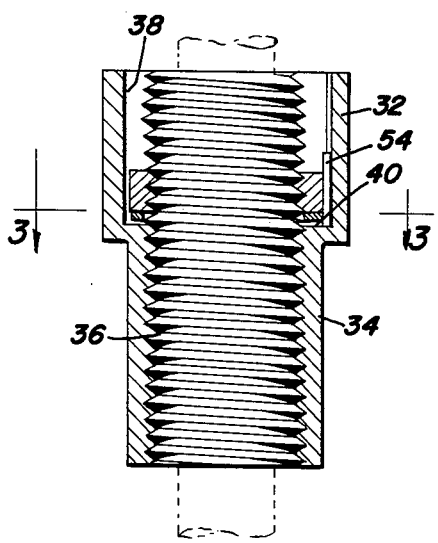
FIGURE 2 is a view in vertical section through the replacement bushing assembly of this invention, the position of the parts being in their slack take-up position.
Figure 3:
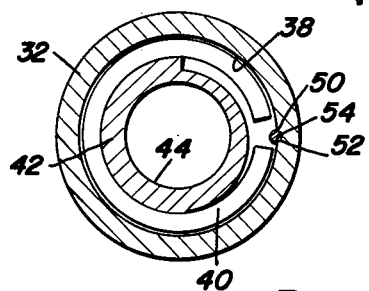
FIGURE 3 is a horizontal sectional view taken substantially upon the plane indicated by the section line 3—3 of FIGURE 2.

The bushing further includes an externally threaded sleeve 42 whose axial bore 44 thereof is adapted to be snugly received upon the shank of the support bracket 12. The threads of the sleeve 42 are adapted to engage the threads 36 of the lower portion 34, with the sleeve extending substantially entirely through the two communicating bores 36 and 38, as shown in FIGURE 2.

Threadedly engaged upon the portion of the sleeve 42 lying within the upper bore 38 is a pressure ring 46 and a resilient means in the form of a spring washer 48 is interposed between this ring and the shoulder 40 to resiliently urge the ring away from the shoulder. As so far described it will be apparent that the pressure ring is movable axially in the enlarged bore 38 and is rotatable upon the sleeve 42 therein.

Locking means are provided to prevent rotation of the pressure ring but permit limited axial movement therein as required by the operation of the device in a manner to be hereinafter set forth.

This locking means consists of registering grooves 50 and 52 formed in the adjacent surfaces of the pressure ring and of the inner wall of the diametrically enlarged bore 38 and a locking pin 54 is received in these registering grooves to thereby prevent rotation of the pressure ring but permit the aforesaid small amount of axial movement.

It will now be understood that the diametrically reduced portion 34 of the bushing may be either inserted in and fixedly secured to the hub 22 of the idler arm or may constitute a portion of this hub. In any event, the resilient means 48 causes the pressure ring to exert a thrust against the sleeve 42 and thereby tension or stress the threaded engagement of this sleeve in the bore 36. This tends to eliminate any wear or play between the threads of the sleeve and the bushing; and if such wear should develop in the future, resilient means would cause axial movement of the pressure ring and of the sleeve to which it is attached thereby taking up such wear. Thus play between the threads of the sleeve and bushing is kept at a minimum, thereby retaining the desired precision fit of the journal of the idler arm.

FIGURE 6 shows the application of this principle of the invention to general use. In this illustration the numeral 70 indicates any desired body having an internally threaded bore 72 therein in which is to be journaled the threaded end of a bolt or shaft or the like. When wear develops between this threaded engagement, the worn threaded journal sleeve is removed and replaced by the replacement sleeve 74 which being externally threaded at as 76 is engaged in the worn threads 72. The same type of pressure ring 78, resilient washer 80 and locking pin 82 previously described may likewise be employed.

In this invention it will be understood that the sleeve 42 being received in the worn threaded portion 36 may be of a slightly different pitch from the original sleeve which it replaced, in order to take up any wear in the threaded portion 36.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is a follows:

1. For use with vehicle steering linkage of the type including a support bracket with a threaded shank thereon and an idler arm having a hub portion with an internally threaded sleeve secured therein threadedly and rotatably receiving said threaded shank portion; a replacement bushing assembly for the idler arm journal hub portion comprising a cylindrical body bushing adapted to be fixedly secured in said hub portion, a threaded bore formed in said bushing body, a smooth counterbore formed in one end of said threaded bore, an externally threaded sleeve threadedly engaged in said threaded bore and extending into said counterbore, a pressure ring received in said counterbore and threadedly engaged on said externally threaded sleeve applying thrust to the threaded engagement of said externally threaded sleeve having a longitudinal bore formed therethrough adapted to receive said shank when the latter is secured to said sleeve for rotation therewith relative to said bushing.

2. The combination of claim 1 including releasable lock means engaging said lock ring and said body for preventing rotation of said pressure ring relative to said body.

3. The combination of claim 2 including resilient means interposed between said pressure ring and the inner end of said counterbore for maintaining thrust on the threaded engagement of said sleeve with said body.

4. The combination of claim 1 including releasable lock means engaging said lock ring and said body for preventing rotation of said pressure ring relative to said body, said lock means comprising complementary axially extending grooves on the adjacent surface of said pressure ring and the inner wall of said counterbore, a lock pin received in said grooves.

References Cited in the file of this patent

UNITED STATES PATENTS

| | | |
|---|---|---|
| 696,777 | Ward | Apr. 1, 1902 |
| 788,324 | Marrow | Apr. 25, 1905 |
| 2,392,701 | Sanders | Jan. 8, 1946 |
| 2,649,337 | Ware | Aug. 18, 1953 |
| 2,650,844 | Schemarry | Sept. 1, 1953 |
| 2,817,380 | Knohl | Dec. 24, 1957 |
| 2,841,412 | Mineck | July 1, 1958 |
| 2,841,413 | Pringle | July 1, 1958 |